No. 750,994. Patented February 2, 1904.

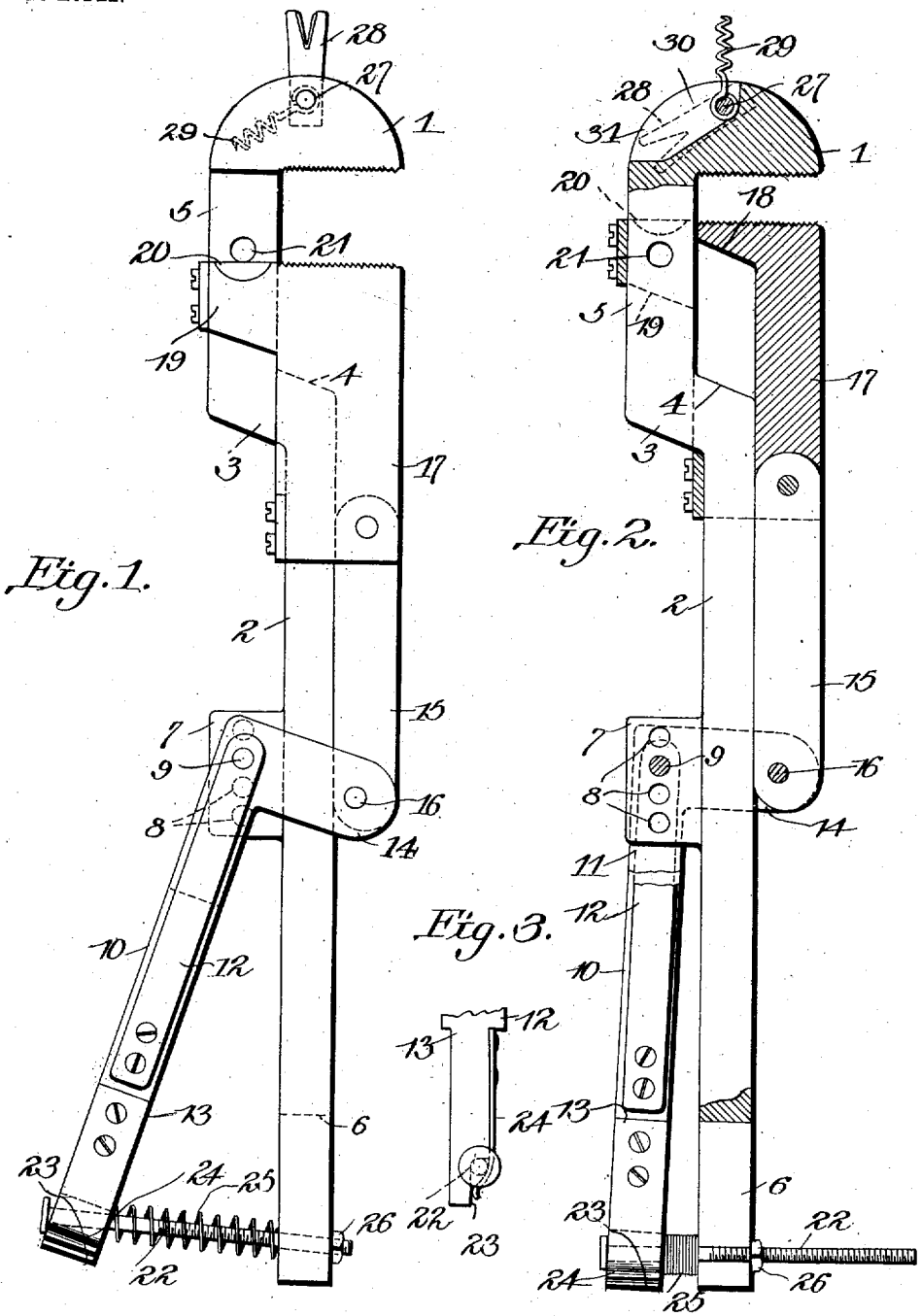

UNITED STATES PATENT OFFICE.

MARQUES McKINLEY, OF CLAYSVILLE, KENTUCKY.

WRENCH.

SPECIFICATION forming part of Letters Patent No. 750,994, dated February 2, 1904.

Application filed September 16, 1903. Serial No. 173,463. (No model.)

*To all whom it may concern:*

Be it known that I, MARQUES McKINLEY, a citizen of the United States, residing at Claysville, in the county of Harrison and State of Kentucky, have invented a new and useful Wrench, of which the following is a specification.

My invention relates to wrenches, and has for its objects to produce a device of this character of comparatively simple construction, which will be efficient in operation and one which may be readily adjusted to accommodate nuts or pipes of varying sizes and locked into engaging position.

With these and other objects in view the invention comprises the novel details of construction and combination of parts more fully hereinafter described.

In the accompanying drawings, Figure 1 is a side elevation of my improved wrench. Fig. 2 is a similar view, partly in section. Fig. 3 is a detail view.

Referring to the drawings, 1 indicates the relatively fixed head or jaw of the wrench, carried at the forward end of a main bar 2, having adjacent to its forward end a lateral bend 3, forming a stop 4, and an elevated portion 5, from the normally under side of which the head 1 depends, the bar 2 being provided at its rear with a longitudinally-disposed rearwardly-opening slot 6, the purpose of which will presently appear.

Attached in any suitable manner to the bar 2, adjacent to its longitudinal center, is a fixed upwardly-extending plate 7, having a plurality of apertures 8 disposed in alinement parallel with the bar, any one of these apertures being adapted to receive the removable pivoting-pin or axle 9 of an operating-lever 10, which is slotted longitudinally, as at 11, to receive the plate 7 and permit the ready engagement of the pivoting-pin with any one of the openings, for the purpose which will be described hereinafter, the pin being maintained in removable engagement with the plate preferably by means of a leaf-spring 12, bolted or otherwise secured to the side of the lever and connected at its free end with the pin.

The operating-lever 10, which is of the bell-crank type, has its main arm 13 disposed above and in substantial parallel relation with the bar 2 and its secondary arm 14 bifurcated to receive said bar and also the rear end of a link 15, pivoted, as at 16, to the lever, and at its forward end to the rear end of the relatively movable jaw 17, which is slidingly mounted upon the bar 2 and coöperates with the fixed jaw 1. The movable jaw is bifurcated to receive the bar 2 and is limited in its rearward movement upon the latter by contact of its front wall 18 with the stop 4, the jaw being provided at its forward end with an upward extension 19, bearing upon the side of the elevated portion 5 of the bar and sharpened, as at 20, for cutting wire or the like, which may be inserted through an opening 21 in the bar.

22 designates a bolt, one end of which is seated in a recess 23, formed adjacent to the rear end of the main lever-arm 13 and removably secured therein by a retaining-spring 24, riveted to the side of the lever. This bolt, which extends loosely through the slot 6, carries a normally-expanded spring 25, disposed between and bearing at its end upon the inner faces of the bar 2 and lever-arm 13 for forcing them apart to maintain the jaw 17 in retracted position, the bolt being provided with an adjustable nut 26, by which the lever can after being operated to move the jaw forward be locked in such position. Attention is here directed to the fact that owing to the bolt being freely movable longitudinally of the slot 6 the lever may be moved bodily longitudinally of the bar for engagement of its pivoting-pin 9 with any one of the openings 8 to obtain any desired initial adjustment of the jaw 17 relative to the jaw 1 for accommodating bodies of varying sizes.

27 indicates a pintle extending transversely through the head 1 for pivoting thereto a nail-extracting claw 28, disposed upon the outer face of the head, and a corkscrew 29, seated in a central slot 30 and adapted to fold into an enlarged socket or recess 31, formed in the outer end face of the head.

From the foregoing it will be seen that I produce a device of comparatively simple construction, which is admirably adapted for the attainment of the ends in view; but it is to be understood that I do not limit myself to the precise details herein set forth, inasmuch as minor changes may be made therein without departing from the spirit or scope of the invention.

Having thus described my invention, what I claim is—

1. The combination with a bar carrying a primary jaw, of a secondary jaw slidably connected with the bar, an operating-lever adjustably and pivotally connected with the bar, operative connections between the lever and secondary jaw, a bolt extending between the lever and bar, said bolt being connected with one of the parts and engaging a longitudinal slot formed in the other, and a normally expanded spring disposed upon the bolt between the bar and lever.

2. The combination with a bar carrying a primary jaw and having a longitudinal slot, of a secondary jaw slidably connected with the bar, an operating-lever adjustably and pivotally connected with the bar, operative connections between the lever and secondary jaw, a bolt carried by the lever and engaging the slot in the bar, a normally expanded spring disposed upon the bolt between the bar and lever, and an adjustable thumb-nut tapped onto the bolt.

In testimony that I claim the foregoing as my own I have hereto affixed my signature in the presence of two witnesses.

MARQUES McKINLEY.

Witnesses:
OLIVER DUNCAN,
J. R. CLARK.